No. 844,393. PATENTED FEB. 19, 1907.
C. H. PAXTON.
TRUNK.
APPLICATION FILED JAN. 6, 1906.

2 SHEETS—SHEET 1.

Witnesses.
C. H. Keeney.
Anna F. Schmidtbauer

Inventor.
Cyrus H. Paxton
By Benedict & Morsell
Attorneys.

No. 844,393. PATENTED FEB. 19, 1907.
C. H. PAXTON.
TRUNK.
APPLICATION FILED JAN. 6, 1906.
2 SHEETS—SHEET 2.
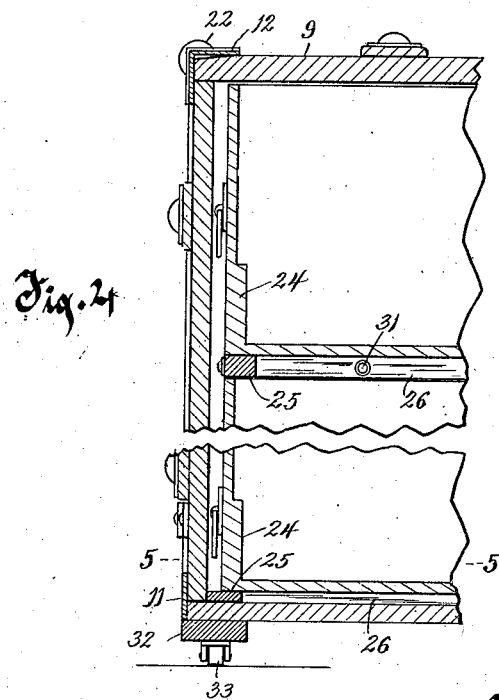
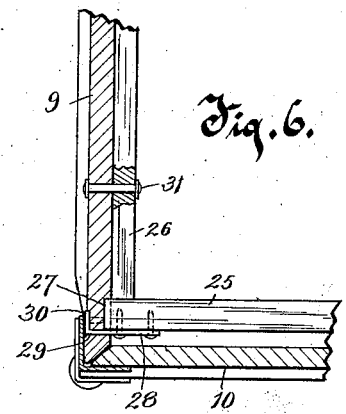
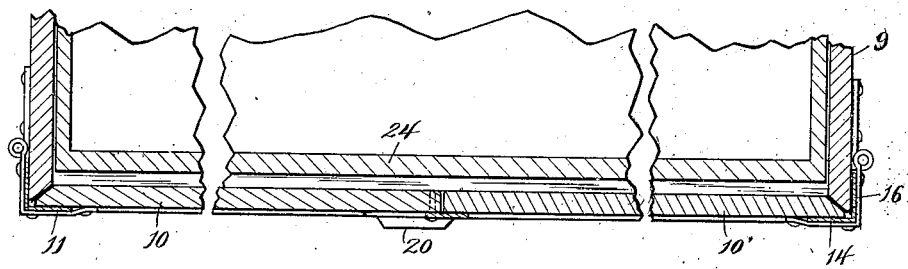
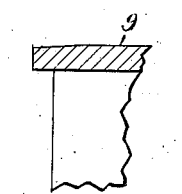
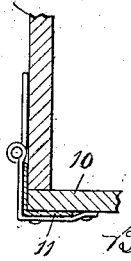

UNITED STATES PATENT OFFICE.

CYRUS H. PAXTON, OF OSHKOSH, WISCONSIN.

TRUNK.

No. 844,393.  Specification of Letters Patent.  Patented Feb. 19, 1907.

Application filed January 6, 1906. Serial No. 294,895.

*To all whom it may concern:*

Be it known that I, CYRUS H. PAXTON, residing in Oshkosh, in the county of Winnebago and State of Wisconsin, have invented new and useful Improvements in Trunks, of which the following is a description, reference being had to the accompanying drawings, which are a part of this specification.

My invention has relation to improvements in trunks.

The primary object of the invention is to provide, in a form of trunk wherein the front of the trunk-body is open and is adapted to be closed by two outwardly-opening doors, a strong and enduring structure which will withstand to the maximum the rough handling to which trunks are ordinarily subjected and which will be, furthermore, ornate in appearance, the improvements being adapted not only for ordinary traveling-trunks, steamer-trunks, &c., but also adapted for use to particular advantage in connection with so-called bureau, dresser, or wardrobe trunks.

With the above primary object and other incidental objects in view the invention consists of the devices and parts or their equivalents, as hereinafter set forth.

Figure 1:
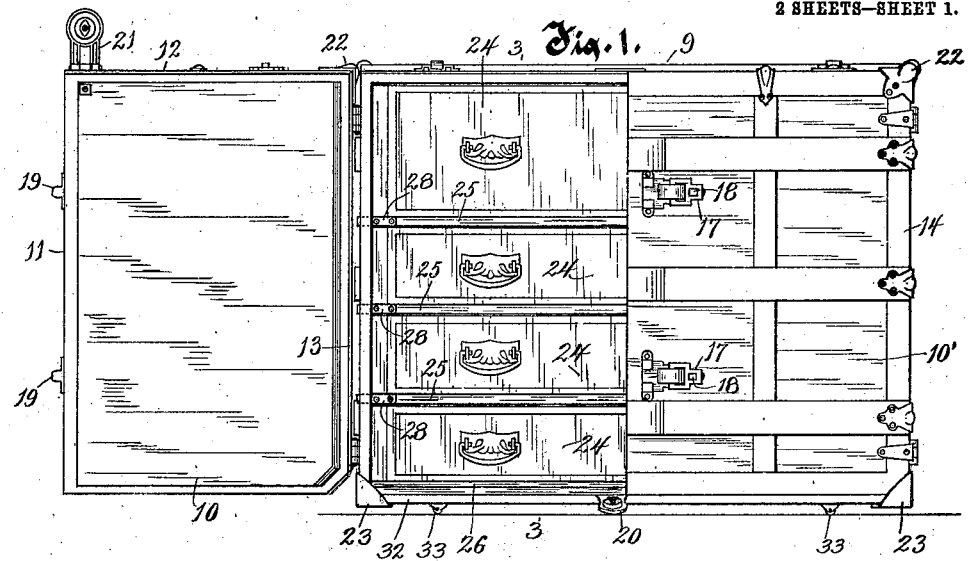
Figure 2:
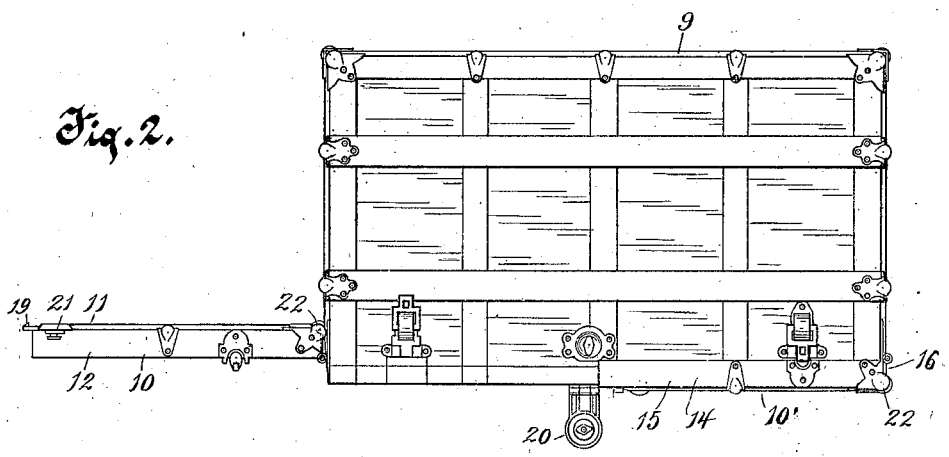
Figure 3:
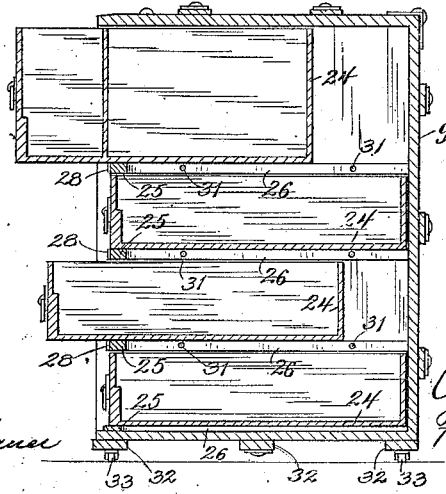

In the accompanying drawings, Figure 1 is a front view with one of the doors open. Fig. 2 is a top plan view. Fig. 3 is a cross-section on the line 3 3 of Fig. 1. Fig. 4 is a transverse section on the same plane as Fig. 3, but with the door closed, parts broken away. Fig. 5 is a horizontal section on the line 5 5 of Fig. 4. Fig. 6 is a horizontal section through one corner of the trunk, showing the manner of fastening the drawer-supports. Fig. 7 is a vertical section through a fragment of the trunk, parts broken away, showing a modified form of door; and Fig. 8 is a cross-section on the line 8 8 of Fig. 7.

The numeral 9 indicates the main portion or body of the trunk, which is provided with an open front side. This trunk-body is of ordinary form and is preferably cut and made square, so that it is without diagonal cuts, whereby a very rigid and strong trunk-body throughout is produced.

The closing and opening of the open front side of the trunk-body is controlled by means of two hinged doors 10 10', the hinges thereof being secured to the opposite ends of the trunk-body and the hinge-straps being continued from the hinge-joint and then bent around against the front sides of the doors and secured thereto, as clearly shown in Fig. 5. The four edges of the door 10 are bound with a rectangular metallic binding-frame 11. All four sides of this frame project beyond the edges of the door, and the projecting portion at the top is bent inwardly at right angles to form an inwardly-extending flange 12, and the projecting portion of the outer side of the said frame is bent rearwardly at right angles to form a rearwardly-extending flange 13. The door 10' is also bound with a metallic binding-frame 14; but this frame is without an inner side portion, so that the inner edge of the door 10' is unprovided with the metallic binding, as is the case with the inner edge of door 10. However, if preferred, the frame 14 may be in the form of a complete rectangular frame, so as to also bind the inner edge of door 10'. The three sides of the frame 14 project beyond the edges of the door 10', and the top projecting portion is bent inwardly at right angles to form an inwardly-extending flange 15, and the outer side portion is bent rearwardly at right angles to form a rearwardly-extending flange 16. The inwardly-extending flanges 12 and 15 of the respective doors in conjunction with the upper edges of the doors proper form grooves which when the doors are closed are adapted to receive therein the front edge of the top of the trunk-body, with the result that the top edges of the doors proper are disposed beneath the top of the trunk-body, while the inwardly-extending flanges overlap the front edge of the top of the trunk-body.

In regard to the rearwardly-extending flanges 13 and 16, these lie against or overlap the opposite ends of the trunk-body, and relative to the projecting portion of the inner side of the metallic frame 11 of door 10, this projecting portion when the doors are closed overlaps the inner edge of door 10', and hence serves to cover and protect the joint which would otherwise be exposed at the meeting edges of the doors.

Door 10' is preferably provided with ordinary forms of spring-clasps 17 17, which are provided with recesses 18 18, adapted when the spring-clasps are thrown down to be engaged by locking-fingers 19 19, projecting from the inner edge of the door 10.

A hinge-lock 20 is carried at the bottom of the trunk-body, and the hinge member thereof is adapted to be turned upwardly against and locked to the door 10, the said hinge member being provided with a suitable keyhole. A hinge-lock 21 is also carried at the top edge of the door 10, and the hinge member of this lock is adapted to be turned down against and locked to the top of the body of the trunk, the said hinge member likewise being provided with a keyhole for the insertion of a key.

Corner metallic protecting-pieces 22 22 are disposed at the upper corners of the doors, and similar metallic pieces 23 23 are carried at the lower corners of the trunk-body, the metallic frames 11 and 14 at these points being cut away to accommodate said protecting-pieces 23.

As heretofore stated, my improvements are applicable to the ordinary form of trunk as well as to steamer-trunks, and when such trunks are constructed in accordance with the invention they provide an exceedingly practicable arrangement and one in which ready access may be obtained to the entire interior of the trunk. The same arrangement and construction for opening and closing the trunk by the provision of the two hinge-doors, as described, is also well adapted for and may be used to great advantage in connection with so-called bureau or dresser trunks, and, as hereinbefore stated, the invention is shown in connection with a trunk of this character.

Referring to the bureau or dresser arrangement, the numerals 24 indicate a series of drawers which may be slidably supported within the body of the trunk in any desired manner. I prefer, however, to provide as the support for each drawer a U-shaped supporting-frame, which comprises a front cleat or strip 25 and side cleats or strips 26 26. Each front cleat extends across the front of the trunk-body from one end piece of said trunk-body to the other, the opposite ends of each of said front cleats being seated in recesses 27 in the end pieces of the trunk-body, as clearly shown in Fig. 6. The front cleats besides being thus supported in the recesses 27 are also anchored to the end pieces of the trunk by means of straps 28, which are secured to said front cleats and are then extended through openings 29 in the end pieces of the trunk-body, and their outer ends are bent at right angles and countersunk in recesses 30 on the outer sides of the end pieces of the trunk-body, as clearly shown in Fig. 6. By the described means for supporting and securing the front cleats 25 the said cleats are not only firmly supported, but, furthermore, by employing in connection therewith the straps 28 arranged as described a means is provided for counteracting longitudinal strain on the trunk—that is to say, any strain to which the trunk may be subjected in a line extending in a direction from one end piece of the trunk-body to the opposite end piece thereof is counteracted.

The side cleats or strips 26 of each U-shaped drawer-supporting frame are secured to the respective end pieces of the trunk-body by means of bolts 31 31, as shown clearly in Figs. 3 and 6.

It will be noticed particularly from Figs. 5 and 6 of the drawings that the front edges of the end pieces of the trunk-body and the outer edges of the doors 10 and 10' are mitered or beveled, so that when the doors are closed a miter-joint is formed.

When the hinge-doors are closed and locked and it is desired to gain access to the interior of the trunk, all that is necessary to be done is to unlock the doors and turn the same outwardly on their hinges. Access is thereby obtained to the interior, and when the bureau or dresser form of trunk is employed the drawers may of course be readily slid outwardly and inwardly on their supporting-frames.

It will be noticed that the front cleat or strip 25 of the lower drawer-supporting frame (see particularly Figs. 1, 3, and 4) is set back slightly from the front edge of the bottom of the trunk-body. This leaves a space of just sufficient width to admit the thickness of the doors 10 and 10' when said doors are closed. The inner sides of the doors when said doors are closed rest directly against the front edge of the lower front cleat 25, and the outer faces of the doors are in direct alinement or flush with the front edge of the bottom piece of the trunk-body. It will also be observed, particularly from Fig. 4, that as the lower edges of the metallic bordering frames of the doors project below the lower edges of said doors, as hereinbefore referred to, the said projecting portions of the frames when the doors are closed fit against the front edge of the bottom of the trunk-body. The under side of the bottom of the trunk-body is provided with the usual strengthening-strips 32, the strip at the front and the strip at the rear having the casters 33 mounted therein. The front strip 32 also projects slightly forward of the front edge of the bottom of the trunk-body, and the lower projecting edges of the lower portions of the metallic frames of the doors rest on top of this projection from the forward under strip 32. The forward edge of this forward under strip 32 also acts as a guard to prevent any object from striking the front edge of the bottom of the trunk body.

A great point of advantage possessed by my invention is the strength and rigidity which is imparted to the entire trunk structure. It will be evident that the metallic binding frames not only materially strengthen the doors, but also the inwardly-projecting top flanges of the two frames 11 and 14, and the rearwardly-projecting side flanges of said frame and the downward projections from the lower portions of said frames secure strength and rigidity at the joints. For instance, in the case of the top flanges, the said flanges being raised a slight distance above the upper edges of the doors, grooves are formed which receive the front edge of the top of the trunk-body, or, in other words, the upper edges of the doors when the doors are closed seat themselves beneath the front edge of the top of the trunk-body, while the inwardly-projecting flanges overlap the front edge of the top of the trunk-body, and with respect to the lower edges of the doors these fit against the front edge of the front strip of the lower U-shaped drawer-supporting frame, and the lower edges of said doors fit against the upper side of the projecting bottom piece of the trunk-body. By this arrangement the trunk-body is braced from the top to the bottom—that is to say, it is braced against any strains tending either to separate the top from the bottom of the trunk-body or any strain tending to force the top and bottom of the trunk-body together. The overlapping top flanges of the metallic frames act to prevent the first-named contingency—that is, the separation of the top from the bottom of the trunk—and the fact that the upper edges of the doors fit beneath the top of the trunk-body and the lower edges of said doors fit against the protruding bottom piece of the trunk-body serves to counteract the last-named contingency—viz., the forcing of the top and bottom of the trunk-body toward each other.

The rearwardly-extending flanges from the outer portions of the metallic binding-frames of the doors tend to counteract longitudinal strain on the trunk-body in a direction tending to separate one end piece of the said trunk-body from the other. The tendency of the end pieces of the trunk-body to spread apart or separate on account of excessive longitudinal strain is also guarded against by reason of the provision of the anchor-straps secured to the forward front strip of the U-shaped drawer-supporting frames and extended outwardly through openings in the end pieces of the trunk-body and being bent at right angles and countersunk into recesses.

In Figs. 7 and 8 I show a modified construction, wherein the doors 10 and 10' do not have their outer edges beveled to meet and match similar beveled surfaces at the forward edges of the end pieces of the trunk-body when the doors are closed to form miter-joints, and instead of the front edges of the top and bottom pieces of the trunk-body being flush with the front edges of the end pieces of the trunk-body the said top and bottom pieces project forwardly slightly beyond the front edges of the end pieces, so that when the doors are closed the outer side edges of the doors overlap the front edges of the contracted end pieces of the trunk-body.

What I claim as my invention is—

1. In a trunk, the combination with a trunk-body having an open side, of doors hinged to the ends of said trunk-body and opening outwardly, a hinge-lock secured to the bottom of the trunk-body, the swinging member of said lock adapted to engage one of the door members, and a hinge-lock secured to the upper edge of said latter door member and the swinging member of the lock adapted to engage the top of the trunk-body.

2. In a trunk, the combination with the body thereof provided with an open front side, of U-shaped drawer-supporting frames secured within the trunk-body, the front strip of each of said frames extending across the front of the trunk-body from end to end thereof, and the side strips of said frame extending along the inner sides of the end pieces of the trunk-body, and straps secured to opposite ends of each forward strip of a U-shaped frame and extending outwardly through openings in the end pieces of the trunk-body and bent at right angles against the outer sides of the end pieces of the trunk-body.

3. In a trunk, the combination with the body thereof provided with an open front side, of U-shaped drawer-supporting frames secured within the trunk-body, the front strip of each of said frames extending across the front of the trunk-body from end to end thereof, and the side strips of said frame extending along the inner sides of the end pieces of the trunk-body, the opposite ends of the forward strip of each U-shaped frame being seated in recesses in the end pieces of the trunk-body, and straps secured to opposite ends of each forward strip of a U-shaped frame and extending outwardly through openings in the end pieces of the trunk-body and bent at right angles against the outer sides of the end pieces of the trunk-body.

In testimony whereof I affix my signature in presence of two witnesses.

CYRUS H. PAXTON.

Witnesses:
GEORGE HILTON,
BART HEISS.